Dec. 27, 1960

C. C. HORNE ET AL 2,965,959

METHOD OF LOCATING THE BLIND TERMINALS OF
FILLED HOLES IN A DEFORMED METAL OBJECT

Filed Dec. 3, 1957

CAMPBELL C. HORNE
HAROLD W. G. HIGNETT
INVENTOR.

BY

ATTORNEY 2,965,959
METHOD OF LOCATING THE BLIND TERMINALS OF FILLED HOLES IN A DEFORMED METAL OBJECT

Campbell C. Horne, Giffnock, Scotland, and Harold W. G. Hignett, Harborne, Birmingham, England, assignors to The International Nickel Company, Inc., New York, N.Y., a corporation of Delaware Filed Dec. 3, 1957, Ser. No. 700,270

Claims priority, application Great Britain Dec. 4, 1956

3 Claims. (Cl. 29—407)

The present invention relates to the production of fluid cooled turbine blades and, more particularly, to a method for locating filled passages therein.

Specifically, this invention relates to metal products made by extruding a billet or the like having one or more blind holes extending over only a part of its length filled with a material that flows during the extrusion, becoming elongated and reduced in cross section during the process. Products made in this way include bars of airfoil section which are formed into turbine blades by further working or machining operations. The part of the extruded bar which is solid, i.e., contains no filler, may be upset to form a root during these operations. Subsequently, the filler is removed thus leaving the elongated holes as passages for the flow of air for cooling purposes. Holes may then be drilled in the root to meet these cooling passages provided the ends thereof can be accurately located.

Turbine blades may also be made from filled billets by extending the billet through a die orifice of airfoil section with the blind ends of the holes leading and stopping the extrusion while enough metal remains in the extrusion container to form the root. Thereafter the leading end of the part of airfoil section may be upset to form a shroud and it then becomes necessary to drill through the upset metal to meet the cooling passages. Again, locating the position of the passage terminals is of primary importance.

Although attempts were made to overcome the foregoing difficulty, none, as far as we are aware, was entirely successful when carried into practice commercially on an industrial scale.

It has now been discovered that by the use of a special sequence of process operations, the aforementioned difficulty may be overcome.

It is an object of the present invention to provide a non-destructive process for locating the blind terminals of filled passages or holes in worked heat-resistant metal.

It is a further object of the present invention to provide an improved process for the production of turbine blades having cooling passages therein.

It is yet a further object to provide a billet for use in an extrusion operation for the production of a cooled turbine blade.

Other objects and advantages will become apparent from the following description taken in conjunction with the accompanying drawing in which.

Generally speaking, the present invention contemplates a non-destructive process for locating the blind terminals of filled holes in worked heat-resistant metal objects which comprises providing a billet or blank of heat-resistant metal containing at least one blind hole, providing a plug of metallic material differing substantially in density from said heat-resistant metal in the bottom of each of each of said holes, filling said holes with a suitable filler, subjecting said blank to a hot-working operation to deform it and thereafter subjecting said filled billet to X-ray examination. It is to be observed that the term "X-ray examination" as used herein includes examination by high penetration radiation other than conventional X-rays. Thus, it is contemplated that other radiation sources such as, inter alia, radium, radon, cobalt 60, or iridium 192 may be used.

According to this invention a small plug of a material differing substantially in density from the metal of the billet or the like is placed in each blind hole before the filler material is inserted in that hole. The plug material should, of course, be compatible with the metal of the billet or the like. In billets of heat-resistant metal made from nickel-chromium alloys, including nickel-chromium-cobalt alloys, the plugs are preferably made of molybdenum. Molybdenum is most advantageous. After the extrusion, the product is examined radiographically and because of the difference in absorption the end of each hole is readily seen. Once the position of the bottom of the filled blind hole is established, further processing operations, including forging, drilling, machining, polishing, etc., may be employed to provide an opening to the blind end of the hole or to otherwise position the hole in the final blade. At an appropriate stage of manufacture, the filler material together with the molybdenum insert is removed from the metal holes by selective leaching with dilute mineral acids.

It is to be observed that by the introduction of the aforementioned metallic plug into compound metal-filler billet a specific contrast medium is employed whereby the end of the hole may be observed regardless of what tortuous path the hole may take. Thus, the end of the filled hole may be clearly observed despite the fact that the filler itself may not be radiographically distinguishable from the heat-resistant metal. When the heat-resistant, creep-resisting metal such as described hereinafter is used in conjunction with a filler having a hot ductility akin to that of the creep-resisting metal such as a ferritic iron-manganese-titanium alloy which may contain about 5% to about 20% manganese, from about 1% to about 10% titanium with the balance essentially iron, the difference in radiation absorption between the two metals is not large enough in order to observe the filler position.

Figure 1:
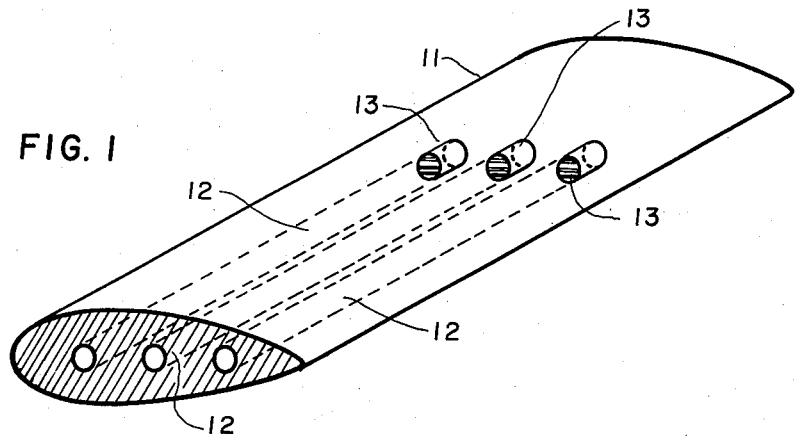
Figure 1 is a view of an extruded bar.
Figure 2:
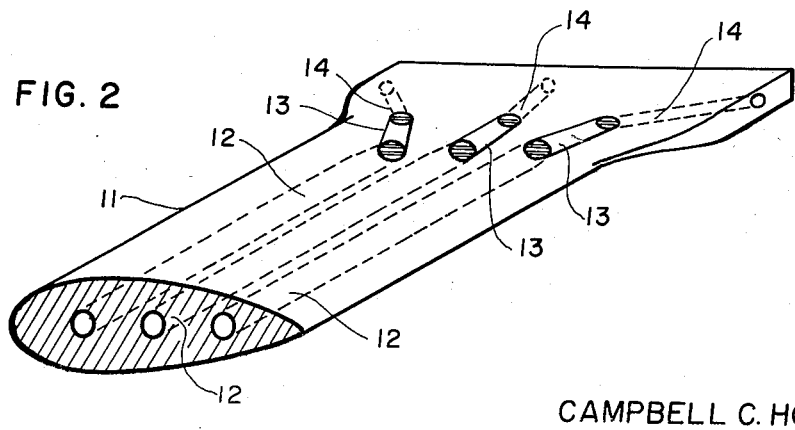
Fig. 2 is a view of the extruded bar of Figure 1 after a metal working operation has been conducted thereon.

Referring now to the drawing, it is to be noted that the airfoil shaped bar 11 produced by extrusion and illustrated in Figure 1 contains a plurality of blind filled passages 12. A slug of metal 13 differing substantially in density from the metal from which bar 11 is made is located at the blind end of each passages 12. Fig. 2 illustrates how the blind ends of filled passages 12 can be displaced during a metal working operation. If it is desired to drill auxiliary holes 14 to connect up with the ends of the blind filled passages, the metal slugs 13 will accurately locate the position of the bottom of filled passages 12 when viewed by penetration radiation.

For the purpose of giving those skilled in the art a better understanding of the invention, the following illustrative example is given:

A cylindrical billet of nickel-chromium alloy having a composition of carbon 0.1 max., titanium 1.8–3.0, chromium 18–21, aluminum 0.8–2.0, silicon 1.5 max., manganese 1.0 max., iron 5.0 max., cobalt 15–21, nickel balance, diameter 2¹³⁄₃₂" x 4" long is drilled with four holes each ⁵⁄₃₂" diameter to a depth of 3½".

A pellet of molybdenum ⁵⁄₃₂" diameter and not more than ⅛" thick is placed at the bottom of each hole. Filler material of iron-manganese-titanium alloy 88–10–2 is then used to plug the holes. The billet is heated to a temperature of 1180° C. and extruded under glass lubrication by the Sejournet process to an aerofoil section whose approximate width 1.77" and whose thickness is 0.625", having a cross-sectional area of about 0.988 square inch. The ends of the holes may then be located by a radiographic technique using iridium 192 as a source of radiation and the length of the solid portion of the extruded bar, which is then known precisely, may be upset to form a root. Holes may then be drilled in the upset block to meet the extruded holes and the filler material may then be removed by immersion in 25% commercial nitric acid (by volume). The molybdenum plugs may be removed by a drilling operation or, alternatively, by the acid solution.

The present invention is particularly applicable to the production of hollow fluid-cooled turbine blades, cooled nozzle guide vanes, and foraminous components for rocket motors made from heat-resistant metal.

With respect to the manufacture of turbine blades by means of the novel process, it should be understood that the term "heat-resistant metal" is used to include austenitic nickel-chromium alloys, including nickel-chromium-iron and nickel-chromium-cobalt and cobalt-chromium alloys, including cobalt-chromium-iron alloys, which contain a total of at least about 25% nickel plus chromium, cobalt plus chromium or nickel plus chromium plus cobalt (i.e., a total of at least about 25% of chromium plus nickel and/or cobalt) in addition to small amounts of aluminum, titanium, molybdenum, tungsten, niobium, tantalum, silicon, manganese, zirconium and boron which may optionally be present in the alloys. These alloys are adapted to be subjected in use to temperatures up to about 700° C. or above and, accordingly, must be hot worked at temperatures around 1200° C. Fillers adapted to cooperate with such heat-resistant metal may be ferritic alloys of iron, manganese and titanium containing from about 5% to about 20% manganese, about 1% to about 10% titanium with the balance essentially iron. Other fillers may be mixtures of ceramic material such as magnesia and metal such as iron, with the metal being the continuous phase and the ceramic material constituting between about 5% and 25% of the composition by weight.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. A non-destructive process for locating the blind terminals of filled holes in worked heat-resistant metal objects which comprises providing a blank of heat-resistant metal which contains at least one blind hole, providing a plug of compatible material differing substantially in density from said heat-resistant metal in the bottom of each of said holes, filling said holes with a suitable filler, deforming the filled blank by working and thereafter subjecting said filled blank to examination with penetrating radiation whereby the blind ends of said holes are located.

2. A billet of heat-resistant metal for use in an extrusion process and having one or more blind holes filled with a material that has a hot ductility similar to that of the said billet in which a small plug of compatible material differing substantially in density from the metal of the billet lies at the blind extremity of each blind hole.

3. A non-destructive process for locating the blind terminals of filled holes in worked heat-resistant metal objects which comprises providing a blank of heat-resistant metal selected from the group consisting of nickel-chromium alloys and cobalt-chromium alloys which contains at least one blind hole, providing a plug of molybdenum in the bottom of each hole in said blank, filling each hole in said blank with a suitable filler, deforming the filled blank by working and thereafter subjecting said filled blank to examination with penetrating radiation whereby each blind end of each hole is located.

References Cited in the file of this patent
UNITED STATES PATENTS

| | | |
|---|---|---|
| 1,574,551 | Bumford | Feb. 21, 1926 |
| 2,021,945 | Payne | Nov. 26, 1935 |
| 2,093,771 | Colwell | Sept. 21, 1937 |
| 2,300,353 | Eberhardt | Oct. 27, 1942 |

FOREIGN PATENTS

| | | |
|---|---|---|
| 755,610 | Great Britain | Aug. 22, 1956 |

OTHER REFERENCES

Pages 772–775, The Welding Encyclopedia, Eleventh Edition, 1943, published by The Welding Engineer Publishing Co., 506 S. Wabash Ave., Chicago, Illinois.

UNITED STATES PATENT OFFICE
CERTIFICATION OF CORRECTION

Patent No. 2,965,959                  December 27, 1960

Campbell C. Horne et al.

It is hereby certified that error appears in the above numbered patent requiring correction and that the said Letters Patent should read as corrected below.

Column 1, line 35, for "extending" read -- extruding --; line 72, after "bottom", strike out "of each".

Signed and sealed this 15th day of August 1961.

(SEAL)
Attest:

ERNEST W. SWIDER
Attesting Officer

DAVID L. LADD
Commissioner of Patents